Dec. 15, 1936.  F. E. STAHL ET AL  2,064,699
GEARING
Filed July 11, 1935
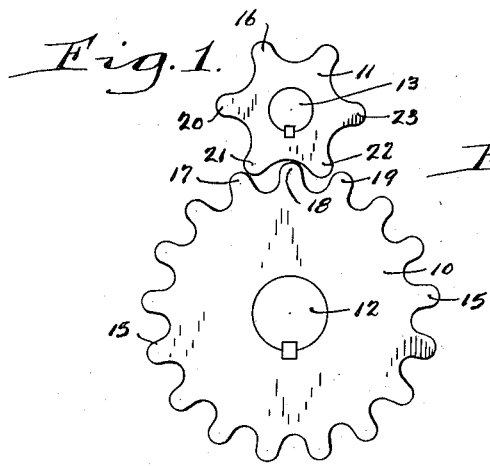
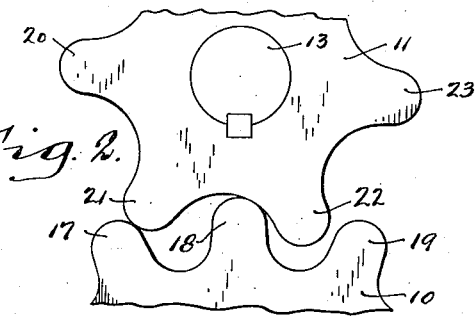
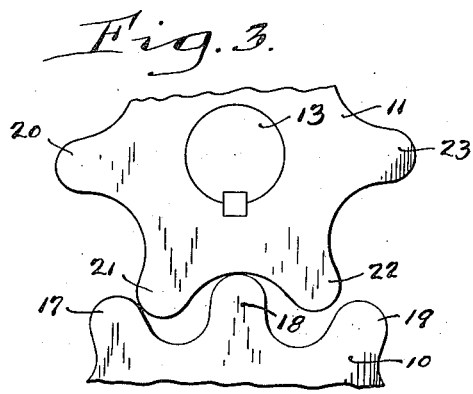
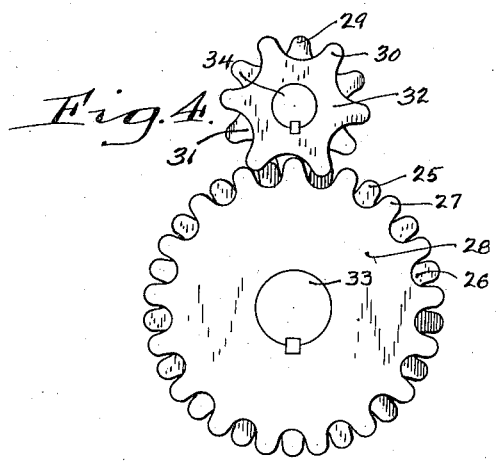
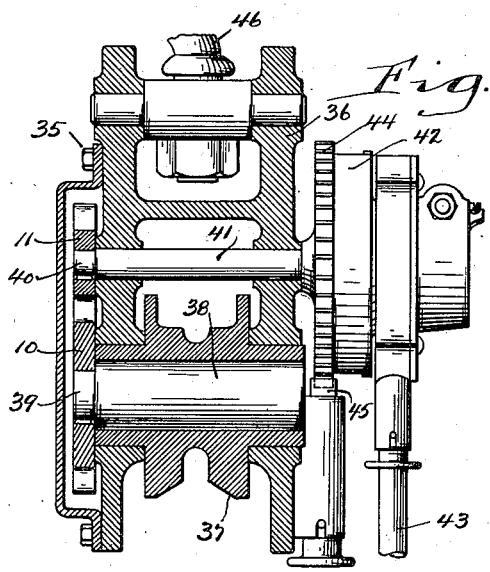
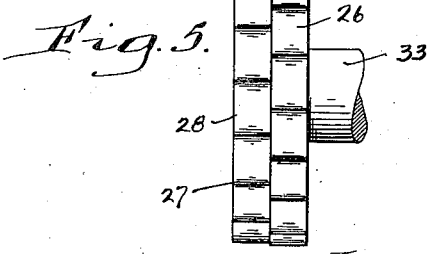
Inventors,
FRANK E. STAHL
and RAYMOND J. KIEFFER
by J. W. Ellis
Attorney.

Patented Dec. 15, 1936

2,064,699

UNITED STATES PATENT OFFICE 2,064,699

GEARING

Frank E. Stahl, Tonawanda, and Raymond J. Kieffer, Getzville, N. Y., assignors to Columbus McKinnon Chain Corporation, Tonawanda, N. Y., a corporation of New York Application July 11, 1935, Serial No. 30,856

5 Claims. (Cl. 74—462)

Our invention relates in general to gearing of the spur type, and in particular to spur gears which shall transmit smooth, uninterrupted motion when driven in one direction but which shall be interrupted and locked when being rotated in the opposite direction.

It is well known to those skilled in the art that hoists are provided with various types of gearing and gear trains which permit easy raising of a load but which prevent the load from actuating the gears in reverse direction when the operator releases his hold upon the hand chain or operating ratchet handle. Such gears are, however, costly and, due to their bulkiness, the size and weight of the hoist is thereby materially increased.

It has been an object of this invention to provide two spur gears which shall give the desired reduction and permit the operator to easily raise the capacity load while, at the same time, locking the load when the operator releases his pull on the hand chain or the raising movement on the ratchet handle of the hoist.

By the provision of two spur gears, the size and weight of the hoist is greatly reduced, and the cost of manufacture is also greatly reduced.

Furthermore, it has been an object to provide gearing of this nature, the teeth of which shall be so formed that the drive gear when operated, shall impart a continuous motion to the driven gear.

The above objects and advantages have been accomplished by the device shown in the accompanying drawing, of which:

Fig. 1 shows a side elevation of a pair of gears made in accordance with our invention with the engaging teeth in one of their locking positions.

Fig. 2 is an enlarged, fragmentary view of the gears, also in locked position.

Fig. 3 is a view similar to Fig. 2 and shows the pinion released from its locking position.

Fig. 4 is a face view of a modified form of gearing.

Fig. 5 is a side elevation of the gearing shown in Fig. 4.

Fig. 6 shows a practical application of our gearing as applied to a hoist of a conventional type.

Referring to Figs. 1 to 3, inclusive, 10 represents the gear and 11 the pinion. The gear is suitably mounted upon a shaft 12 and the pinion is also suitably mounted upon a shaft 13. The gear 10 is provided with a plurality of teeth 15 and the pinion is provided with a plurality of teeth 16. The circular pitch of the teeth 16 of the pinion is greater than the circular pitch of the teeth 15 of the gear, and, so that the gear and pinion will mesh, the teeth thereof are specially formed as hereinafter described. For convenience of description, in Figs. 2 and 3 we have identified the teeth 15 of the gear shown in these figures as 17, 18, and 19. Similarly, we have indicated the teeth 16 of the pinion which are shown in these figures as 20, 21, 22, and 23.

The teeth 15 of the gear and the teeth 16 of the pinion are substantially the same thickness when measured on the pitch circle; and, since the pinion teeth are of considerably greater circular pitch than the circular pitch of the teeth of the gear, the space between adjacent teeth of the pinion is greater than the space between adjacent teeth of the gear. The teeth 15 and 16 may be of usual epicycloidal or involute form, but in order to have the driving gear impart a continuous motion to the driven gear during its operation, it is desirable that the engaging teeth have continuous smooth rolling action so that they roll smoothly into and out of engagement with each other, thus avoiding any dwells or intermittent stops in the rotation of the driven gear by the driving gear. The teeth 15 and 16 are, therefore, so formed that the surfaces of the addenda are substantially semi-cylindrical. The surfaces of the dedendum of each tooth of the gear are preferably so formed that two such adjacent and joining surfaces, together, form a space below the pitch circle of the gear which is substantially semi-cylindrical in shape. The surfaces bounding the dedendum of each of the teeth of the pinion are curved and the surfaces of adjacent teeth are connected by a curved surface so formed that the teeth 15 of the gear will, when engaged with such curved surfaces, smoothly roll thereon so that the driving gear, when rotated, will cause the driven gear to be rotated in a continuous manner.

As clearly shown in Figs. 1 to 3, inclusive, when the pinion is driven clockwise, the tooth 22 thereof will engage with the tooth 18 of the gear and will cause the gear to be rotated at uniform speed in counterclockwise direction. Just before the tooth 22 reaches the position occupied by the tooth 21, the tooth 23 of the pinion will have been brought into engagement with the tooth 19 of the gear, and thus the gear will be rotated in a substantially uniform manner. For clearness of description, it will be assumed that the gear 10 as it rotates in counterclockwise direction is elevating a load as it would if it were used in a hoist. The tendency of the load is, therefore, to rotate this gear in clockwise direction against the elevating movement. It will be seen, therefore, that the teeth 15 of the gear 10 will always be kept in engagement with the advance side of the teeth 16 of the pinion. The relative pitch of the teeth 15 and 16 of the gear and pinion, respectively, are so designed that the tooth 21, for instance, in Fig. 2, will come to rest against tooth 17 of the gear when the high points of the radii of these two or similarly engaged teeth are in abutting relation, as clearly shown in Figs. 1 and 2. In this position the pull produced by the load, tending to rotate the gear 10 in clockwise direction, will keep the high points of the engaging surfaces of the teeth 21 and 17 in contact and thus serve to prevent further rotation of the gear 10 in clockwise direction, whereby the load carried by the gear will be sustained. The pinion may thus be rotated in clockwise direction any desired number of times always imparting to the gear a smooth continuous motion; and, each time the engaging teeth come to rest in the position shown in Figs. 1 and 2, the gear 10 will be maintained in the position where it comes to rest. When it is desired to rotate the gear 10 in opposite or clockwise direction, it is necessary that the pinion 11 be rotated in counterclockwise direction to release each pair of engaging teeth. As the load is being lowered, it is obvious that the tooth 21 will be pulled out of engagement with the tooth 17 of the gear and that the tooth 20 of the pinion will engage with the next tooth of the gear when it has rotated to locking position. It will be clear that as the tooth 20 is is being moved to engaging position, the tooth 21 will engage with tooth 17 and prevent the gear 10 from getting beyond control until such time as the tooth 20 meets and contacts with the next tooth on the gear. The gear 10 may thus be rotated in clockwise direction to lower the load by an intermittent or step-by-step movement, the engagement of the teeth being such that the load will be intermittently sustained.

The teeth 15 and 16 of the gear 10 and pinion 11, respectively, must, of course, when used in a hoist or other lifting device, be so proportioned as to have sufficient strength to sustain the estimated load at the proper factor of safety, and the circular pitch, therefore, of the teeth must be of considerable size. For this reason, when the load is being lowered, there is a tendency for the gear 10 to gain speed before the next pinion tooth 20 comes into engagement with the next coacting tooth on the gear 10. This will, of course, cause sudden stoppage of the gear 10 and a consequent jolting of the load each time the teeth come into engagement. In order to reduce the amount of free movement of the gear, a number of gears may be used with their teeth in staggered or sequential arrangement. For clearness of illustration, we have shown in Figs. 4 and 5 the use of two gears and two pinions. The teeth 25 of the gear 26, as shown in these figures, are staggered in relation to the teeth 27 of the gear 28. In like manner, the teeth 29 and 30 of the pinions 31 and 32, respectively, are staggered. It will thus be seen that when two gears are used as shown, the teeth of each pair of gears will come into engagement alternately and thus reduce the amount of free movement of the gears 26 and 27 to one-half that of a single pair of gears with the same relative circular pitches. It will be obvious that both gears 26 and 28 are keyed or otherwise fastened to a shaft 33, and that both pinions 31 and 32 are keyed or otherwise fastened to a shaft 34.

In Fig. 6, we have shown a practical application of our invention as used upon a hoist 35. This hoist comprises a casing 36. The load lift wheel 37 of the hoist is suitably mounted upon a shaft 38 which extends to the left-hand side of the casing and upon the end 39 of which is secured in non-rotatable manner the gear 10. Mounted above the gear 10 and in relation shown in Fig. 1, is the gear pinion 11. This gear pinion is mounted upon the outer end 40 of an operating shaft 41 which is rotatably mounted in the casing. Mounted upon the operating shaft 41 is a suitable brake 42 and operating handle 43. This brake is provided so that when the load is being lowered in the manner above described, the free movement of the gear 10 and the consequent tendency to drive the pinion is prevented. The engaging teeth serve to lock the load positively, but the brake is of sufficient capacity so as to prevent the gear 10 from driving the pinion 11 at any point in its rotation. This brake is provided with the customary ratchet wheel 44 which is engaged by means of a ratchet pawl 45. The hook 46 of the hoist is represented in fragmentary manner at the top of Fig. 6.

While we have shown our invention as applied to hoists, it is clear that it may be used for various other purposes. Furthermore, in the accompanying drawing, and specification, we have described the invention as applied to spur gears, but it is obvious that the invention may also be applied to other types of gears such as bevel gears and the like.

These and other modifications of the details herein shown and described may be made without departing from the spirit of our invention or the scope of the appended claims, and we do not, therefore, wish to be limited to the exact embodiment herein shown and described, the form shown being merely a preferred embodiment thereof.

Having thus described our invention, what we claim is:

1. A pair of gears, each gear being provided with teeth, the circular pitch of the teeth of one gear being greater than the circular pitch of the teeth of the other gear, such teeth being so formed that they will mesh, the addenda of the teeth of the gear being substantially semi-cylindrical in shape, whereby when the gear having teeth of greater circular pitch is acting as the driver, it will impart to the driven gear a continuous rotary motion and when the gear having the teeth of lesser circular pitch is acting as the driver, the teeth thereof will be successively locked with the engaging teeth of the other gear.

2. A pair of gears comprising a gear and a pinion, said gear and pinion being each provided with teeth, the circular pitch of the teeth of the pinion being greater than the circular pitch of the teeth of the gear, such teeth being so formed that they will mesh, the addenda of the teeth of the gear and pinion being substantially semi-cylindrical, whereby when the pinion is acting as the driver, it will be in continuous driving contact with the gear and when the gear is acting as the driver, the teeth of the pinion will successively lock with the engaging teeth of the gear.

3. A pair of gears comprising a gear and a pinion, said gear and pinion being provided with teeth, the circular pitch of the pinion being greater than the circular pitch of the teeth of the gear, such teeth being so formed that they will mesh, the addenda of the teeth of the gear and pinion being substantially semi-cylindrical in shape, the surfaces bounding the dedenda of the teeth being curved, whereby when the pinion is acting as the driver, it will be in continuous driving contact with the gear and when the gear is acting as the driver, the teeth of the pinion will successively lock with the engaging teeth of the gear.

4. In a hoisting device, the combination with the load lift wheel and the operating means therefor, of a pair of gears, said gears connecting the load lift wheel with the operating means and comprising a gear and a pinion, said gear and pinion being each provided with teeth, the circular pitch of the teeth of the pinion being greater than the circular pitch of the teeth of the gear, such teeth being so formed that they will mesh, the addenda of the teeth of the gear and pinion being substantially semi-cylindrical, whereby when the pinion is acting as the driver it will be in continuous driving contact with the gear and when the gear is acting as the driver, the teeth of the pinion will successively lock with the engaging teeth of the gear.

5. In a hoisting device, the combination with a casing, a load lift wheel, a shaft for the load lift wheel, operating means for the hoist, and an operating shaft for the operating means, of friction brake means carried by the operating shaft and the casing, a pair of gears connecting the shaft of the load lift wheel with the operating shaft, comprising a gear mounted on the wheel shaft and a pinion mounted on the operating shaft, said gear and pinion being each provided with teeth, the circular pitch of the teeth of the pinion being greater than the circular pitch of the teeth of the gear, such teeth being so formed that they will mesh, the addenda of the teeth of the gear and pinion being substantially semi-cylindrical, whereby when the pinion is acting as the driver it will be in continuous driving contact with the gear and when the gear is acting as the driver, the teeth of the pinion will successively lock with the engaging teeth of the gear.

FRANK E. STAHL.
RAYMOND J. KIEFFER.